US005641849A

United States Patent [19]
Nishida et al.

[11] Patent Number: 5,641,849
[45] Date of Patent: Jun. 24, 1997

[54] METHOD FOR PRODUCING POLYSILANES

[75] Inventors: Ryoichi Nishida, Ikoma; Shinichi Kawasaki, Tsuzuki; Hiroaki Murase, Kobayashi, all of Japan

[73] Assignee: Osaka Gas Company Limited, Osaka, Japan

[21] Appl. No.: 406,526

[22] Filed: Mar. 20, 1995

[30] Foreign Application Priority Data

Mar. 22, 1994 [JP] Japan .................................. 6-050577
Jan. 18, 1995 [JP] Japan .................................. 7-006086

[51] Int. Cl.$^6$ .................................................. C08G 77/00
[52] U.S. Cl. ............................. 528/10; 528/33; 528/34; 528/38; 205/420
[58] Field of Search ..................... 204/59 R, 59 QM; 528/10, 33, 34, 38; 205/420

[56] References Cited

U.S. PATENT DOCUMENTS 5,120,406  6/1992  Shono et al. ...................... 204/59 QM

FOREIGN PATENT DOCUMENTS

0446578A3  9/1991  European Pat. Off. .
0558760A1  8/1993  European Pat. Off. .

Primary Examiner—Melvyn I. Marquis
Attorney, Agent, or Firm—Larson & Taylor

[57] ABSTRACT

The present invention provides a method for producing polysilane characterized in that starting halosilane is subjected to electrochemical reaction using Mg or Mg alloy as anode, lithium salt as supporting electrolyte and aprotic solvent as solvent, thereby producing polysilane. The present invention affords polysilane in a high yield, whose molecular weight is uniform and high enough to be cast into an excellent thin film, with an ease of handling, safety and a low cost ensured.

28 Claims, 4 Drawing Sheets

METHOD FOR PRODUCING POLYSILANES

TECHNICAL FIELD

The present invention relates to a method for production of polysilanes.

PRIOR ART AND ITS PROBLEMS

Polysilanes are attracting attention for their use as ceramic precursors; optoelectronic materials such as photoresist, organic photosensitive material, optical waveguide and optical memory; etc. Heretofore, a method for producing polysilane is known wherein in the presence of alkali metals such as metallic sodium, dialkyldihalosilane or dichlorotetraalkyldisilane dissolved in a solvent of toluene is subjected to reductive coupling with long period of stirring at a temperature over 100° C. (J. Am. Chem. Soc., 103 (1981) 7352). However, the method has the following drawbacks: It requires to be performed under severe reaction conditions (e.g., heat must be applied for a prolonged time). It inevitably causes the oxygen atom inclusion in the main chain originated from an oxide film on the metal surface. And the use of alkali metal in large amount poses a serious safety problem where polysilane is industrially mass-produced.

To overcome these drawbacks, several methods for producing polysilane under moderate conditions have been proposed, as described below. These methods are carried out by subjecting dihalosilane to electrochemical reduction at room temperature.

Method (a) uses mercury or cadmium as anode, platinum, mercury or the like as cathode, tetra-n-butylammonium perchlorate as supporting electrolyte and 1,2-dimethoxyethane as solvent in an H-shaped cell equipped with a diaphragm (J. Organomet. Chem., 212 (1981) 155).

Method (b) uses metals such as Al as electrode, quaternary ammonium salt such as tetra-n-butylammonium chloride as supporting electrolyte and 1,2-dimethoxyethane as solvent (Japanese Unexamined Patent Publication No. 3-104893).

Method (c) uses metals such as Mg as electrode, lithium perchlorate as supporting electrolyte and tetrahydrofuran (THF) as solvent (J. Chem. Soc., Chem. Commun., 1160, 1990, Japanese Unexamined Patent Publication No. 4-331235, Japanese Unexamined Patent Publication No. 6-73180, Japanese Unexamined Patent Publication No. 6-98075).

Method (d) uses Al as electrode, THF plus hexamethylphosphoric triamide (HMPA) as solvent and lithium chloride as supporting electrolyte (NATO ASI Ser. Ser. E, 206, 79-85, 1992).

However, the method (a) has drawbacks in that use of the metal (mercury or cadmium) as anode poses a serious problem in view of handling, safety and environmental pollution, and the resulting product is not a compound which can be actually identified as polysilane.

The method (b) is not an efficient system for producing polysilane since the degree of polymerization is merely about 20. When polysilane is applied to optoelectronic materials, it must be formed into a thin film. And in order to make an excellent thin film to be practically used as optoelectronic materials, polysilane must be dissolved in a solvent and have a degree of polymerization of at least 30, preferably over 50. Therefore as a matter of fact, the polysilane obtained pursuant to the method (b) cannot be applied to optoelectronic materials. Moreover, quaternary ammonium salt used as supporting electrolyte is so expensive that this method becomes very costly even if a desired polysilane is obtained.

The method (c) provides an efficient electroreductive system affording a high yield of polysilane having high and uniform molecular weight, with an ease of handling and without concern for environmental pollution employing a safe metal anode. However, lithium perclorate used as supporting electrolyte is too expensive and must be handled so carefully. Hence there remains a need for developing a new system using as supporting electrolyte a compound which is inexpensive and easy to handle.

The method (d) uses lithium chloride as supporting electrolyte that is inexpensive and easy to handle. However, when the solvent is THF alone, the solubility of lithium chloride is too low to carry the electric current and hence the reaction does not proceed. If HMPA or the like is added as solvent, the reaction can be run, but this solvent is suspected to be carcinogenic. Furthermore, the molecular weight of polysilane thus produced is merely 930 (degree of polymerization: approximately 8) and such a polysilane is quite unable to be cast into a thin film.

PROBLEMS TO BE SOLVED BY THE INVENTION

It is a principal objective of the present invention to provide a new method for producing polysilanes in a high yield, whose molecular weight is uniform and high enough to be formed into an excellent thin film, with an ease of handling, safety and a low cost.

MEANS FOR SOLVING THE PROBLEMS

The inventors conducted extensive research to resolve the above problems of conventional techniques and discovered that the prior art problems can be substantially obviated or significantly mitigated by subjecting halosilane to electroreduction with using a specified metal anode, a specified solvent and a specified supporting electrolyte.

Further discovery is that when a specified chemical compound (hereinafter referred to as "current carrying aid") is added to the reaction system, current conductivity is so improved that the time required to produce polysilane is drastically shortened.

The present invention provides a method for producing polysilane as described below:

1. A method for producing polysilane characterized in that dihalosilane of the general formula

(1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom) is subjected to electrochemical reaction using Mg or Mg alloy as anode, lithium salt as supporting electrolyte and aprotic solvent as solvent, thereby producing polysilane of the general formula

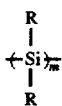 (2)

(wherein R is as defined above corresponding to the starting material; n is 20 to 10000).

2. A method for producing polysilane characterized in that dihalosilane of the general formula

 (1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom) is subjected to electrochemical reaction using Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing polysilane of the general formula

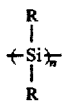 (2)

(wherein R is as defined above corresponding to the starting material; n is 20 to 10000).

3. A method for producing polysilane characterized in that a compound of the general formula

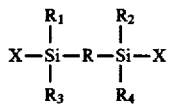 (3)

(wherein R represents aromatic group, unsaturated aliphatic group, —(CH$_2$)$_m$— group or —(CH$_2$—CH$_2$—O)$_m$— group [m is 1 to 20]; R$_1$, R$_2$, R$_3$ and R$_4$ are the same or different and represent hydrogen atom, alkyl group, aryl group, alkoxy group or amino group; X represents halogen atom) is subjected to electrochemical reaction using Mg or Mg alloy as anode, lithium salt as supporting electrolyte and aprotic solvent as solvent, thereby producing a polymer of the following general formula containing Si—Si bonds in a main chain

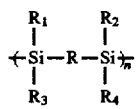 (4)

(wherein R$_1$, R$_2$, R$_3$ and R$_4$ are as defined above; n is 20 to 10000).

4. A method for producing polysilane characterized in that a compound of the general formula

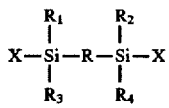 (3)

wherein R represents aromatic group, unsaturated aliphatic group, —(CH$_2$)$_m$— group or —(CH$_2$—CH$_2$O)$_m$— group [m is 1 to 20]; R$_1$, R$_2$, R$_3$ and R$_4$ are the same or different and represent hydrogen atom, alkyl group, aryl group, alkoxy group or amino group; X represents halogen atom) is subjected to electrochemical reaction using Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a polymer of the following general formula containing Si—Si bonds in a main chain

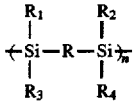 (4)

(wherein R$_1$, R$_2$, R$_3$ and R$_4$ are as defined above; n is 20 to 10000).

5. A method for producing polysilane characterized in that trihalosilane of the general formula

 RSiX$_3$ (5)

(wherein R represents hydrogen atom, alkyl group, aryl group, alkoxy group or amino group; X represents halogen atom) is subjected to electrochemical reaction using Mg or Mg alloy as anode, lithium salt as supporting electrolyte, and aprotic solvent as solvent, thereby producing a silicon network polymer of the general formula

 [RSi]$_n$ (6)

(wherein R is as defined above corresponding to the starting material; n is 20 to 10000).

6. A method for producing polysilane characterized in that trihalosilane of the general formula

 RSiX$_3$ (5)

(wherein R represents hydrogen atom, alkyl group, aryl group, alkoxy group or amino group; X represents halogen atom) is subjected to electrochemical reaction using Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a silicon network polymer of the general formula

 [RSi]$_n$ (6)

(wherein R is as defined above corresponding to the starting material; n is 20 to 10000).

7. A method for producing polysilane characterized in that dihalosilane of the general formula

 (1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom) and trihalosilane of the general formula

 RSiX$_3$ (5)

(wherein R represents hydrogen atom, alkyl group, aryl group, alkoxy group or amino group; X represents halogen atom) are subjected to electrochemical reaction using Mg or Mg alloy as anode, lithium salt as supporting electrolyte and aprotic solvent as solvent, thereby producing a network polymer containing Si—Si bonds in the backbone structure composed of a structural unit of the general formula

 (7)

(wherein R is as defined above) and a structural unit of the general formula

RSi≡ (8)

(wherein R is as defined above).

8. A method for producing polysilane characterized in that dihalosilane of the general formula

 (1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom) and trihalosilane of the general formula RSiX$_3$ (5)

(wherein R represents hydrogen atom, alkyl group, aryl group, alkoxy group or amino group; X represents halogen atom) are subjected to electrochemical reaction using Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula

 (7)

(wherein R is as defined above) and a structural unit of the general formula

RSi≡ (8)

(wherein R is as defined above).

9. A method for producing polysilane characterized in that dihalosilane of the general formula

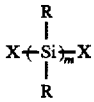 (1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom) and tetrahalosilane of the general formula SiX$_4$ (9)

(wherein X represents halogen atom) are subjected to electrochemical reaction using Mg or Mg alloy as anode, lithium salt as supporting electrolyte and aprotic solvent as solvent, thereby producing a network polymer containing Si—Si bonds in the backbone structure composed of a structural unit of the general formula

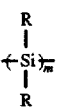 (7)

(wherein R is as defined above) and a structural unit of the general formula

Si≡ (10)

10. A method for producing polysilane characterized in that dihalosilane of the general formula

 (1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom) and tetrahalosilane of the general formula SiX$_4$ (9)

(wherein X represents halogen atom) are subjected to electrochemical reaction using Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula

 (7)

(wherein R is as defined above) and a structural unit of the general formula

Si≡ (10)

11. A method for producing polysilane characterized in that trihalosilane of the general formula RSiX$_3$ (5)

(wherein R represents hydrogen atom, alkyl group, aryl group, alkoxy group or amino group; X represents halogen atom) and tetrahalosilane of the general formula SiX$_4$ (9)

(wherein X represents halogen atom) are subjected to electrochemical reaction using Mg or Mg alloy as anode, lithium salt as supporting electrolyte and aprotic solvent as solvent, thereby producing a network polymer containing Si—Si bonds in the backbone structure composed of a structural unit of the general formula $$RSi\equiv \qquad (8)$$

(wherein R is as defined above) and a structural unit of the general formula $$Si\equiv \qquad (10)$$

12. A method for producing polysilane characterized in that trihalosilane of the general formula $$RSiX_3 \qquad (5)$$

(wherein R represents hydrogen atom, alkyl group, aryl group, alkoxy group or amino group; X represents halogen atom) and tetrahalosilane of the general formula $$SiX_4 \qquad (9)$$

(wherein X represents halogen atom) are subjected to electrochemical reaction using Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula $$RSi\equiv \qquad (8)$$

(wherein R is as defined above) and a structural unit of the general formula $$Si\equiv \qquad (10)$$

13. A method for producing polysilane characterized in that dihalosilane of the general formula $$X{+}Si{\underset{R}{\overset{R}{|}}}_{m}X \qquad (1)$$

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom), trihalosilane of the general formula $$RSiX_3 \qquad (5)$$

(wherein R represents alkyl group, aryl group, alkoxy group or amino group; X represents halogen atom) and tetrahalosilane of the general formula $$SiX_4 \qquad (9)$$

(wherein X represents halogen atom) are subjected to electrochemical reaction using Mg or Mg alloy as anode, lithium salt as supporting electrolyte and aprotic solvent as solvent, thereby producing a network polymer containing Si—Si bonds in the backbone structure composed of a structural unit of the general formula $$\mathopen{+}Si{\underset{R}{\overset{R}{|}}}\mathclose{)}_{\overline{m}} \qquad (7)$$

(wherein R is as defined above), a structural unit of the general formula $$RSi\equiv \qquad (8)$$

(wherein R is as defined above) and a structural unit of the general formula $$Si\equiv \qquad (10).$$

14. A method for producing polysilane characterized in that dihalosilane of the general formula $$X{+}Si{\underset{R}{\overset{R}{|}}}_{m}X \qquad (1)$$

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom), trihalosilane of the general formula $$RSiX_3 \qquad (5)$$

(wherein R represents alkyl group, aryl group, alkoxy group or amino group; X represents halogen atom) and tetrahalosilane of the general formula $$SiX_4 \qquad (9)$$

(wherein X represents halogen atom) are subjected to electrochemical reaction using Mg or Mg alloy as anode, lithium salt as supporting electrolyte Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula $$\mathopen{+}Si{\underset{R}{\overset{R}{|}}}\mathclose{)}_{\overline{m}} \qquad (7)$$

(wherein R is as defined above), a structural unit of the general formula $$RSi\equiv \qquad (8)$$

(wherein R is as defined above) and a structural unit of the general formula $$Si\equiv \qquad (10)$$

DETAILED DESCRIPTION OF THE INVENTION

Figure 1:
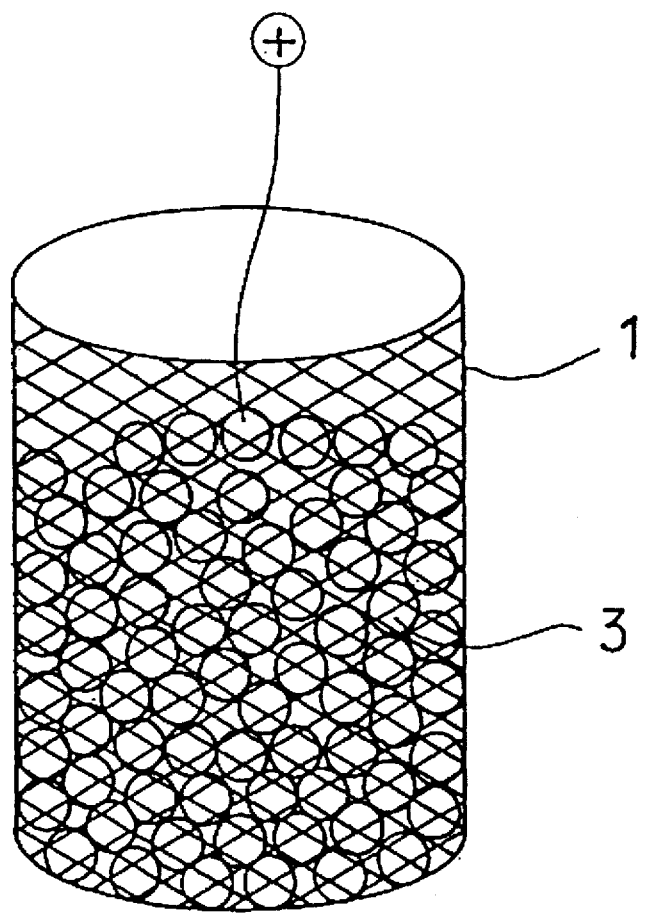
FIG. 1 is an oblique view of a basket-like container or a basket used in the method of the present invention which contains balls made of Mg or Mg alloy constituting anode.

The present invention is illustrated in detail below. In the following illustrations, for example, "the invention stated in Claim 1 described in an independent claim style and the invention(s) stated in its dependent claim (s)" are referred to as "the 1st invention of the present application." Correspondingly the other inventions are referred to in the same manner. And all the present inventions as a whole are simply referred to as "the invention of the present application."

1. the 1st invention of the present application

In the 1st invention of the present application, halosilane used as the starting material is dihalosilane of the general formula

  (1)

(wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom).

In the 1st invention of the present application, the reaction product is polysilane of the general formula

  (2)

(wherein R is as defined above corresponding to the starting material; n is 20 to 10000).

In the dihalosilane represented by the general formula (1), m is 1 to 3, and hydrogen atom, amino group and organic substituents (alkyl group, aryl group, alkoxy group or amino group) which are represented by R are the same or at least two of them are different. Stated more specifically, two Rs are the same or different in case of m=1, four Rs are the same or at least two of them are different in case of m=2 and six Rs are the same or at least two of them are different in case of m=3.

Preferred compounds represented by the general formula (1) are those in which m is 1 or 2. Examples of the alkyl group are those having 1 to 10 carbon atoms, among which those of 1 to 6 carbon atoms are preferable. Examples of the aryl group include, for example, phenyl group, phenyl group substituted with at least one alkyl group of 1 to 6 carbon atoms, p-alkoxyphenyl group, naphthyl group, etc. Examples of the alkoxy group are those having 1 to 10 carbon atoms, among which those of 1 to 6 carbon atoms are preferred. When Rs are amino group and organic substituents, at least one of hydrogen atoms may be substituted with other functional group such as alkyl, aryl or alkoxy group. Examples of the functional group are those as stated above.

In the general formula (1), X represents halogen atom (Cl, F, Br and I). Cl is more preferable as halogen atom.

In the method of the 1st invention of the present application, dihalosilane of the general formula (1) are usable singly or at least two of them can be used in mixture. Dihalosilane of the highest purity is preferably used. As a preliminary treatment for use, liquid dihalosilane is preferably dried over calcium hydride and then distilled, and solid dihalosilane is preferably purified by recrystallization.

Prior to the reaction, dihalosilane is dissolved in a solvent. Examples of useful solvents include a wide range of aprotic solvents. Specific examples are the ether solvents such as tetrahydrofuran, 1,2-dimethoxyethane, propylene carbonate, acetonitrile, dimethylformamide, dimethylsulfoxide, bis(2-methoxyethyl)ether, p-dioxane, methylene chloride, etc. These solvents are usable singly or at least two of them can be used in mixture. Among the solvents, more preferable are tetrahydrofuran and 1,2-dimethoxyethane. Too low a concentration of dihalosilane in the solvent causes reduction of current efficiency. Contrarily, too high a concentration thereof may deteriorate the solubility of supporting electrolyte. Accordingly a suitable concentration of dihalosilane in the solvent is about 0.05 to about 20 mol/l, preferably about 0.2 to about 15 mol/l, more preferably about 0.3 to about 13 mol/l.

Examples of supporting electrolytes usable in the 1st invention of the present application are such inexpensive lithium salts as LiCl, LiNO$_3$, Li$_2$CO$_3$, etc. These supporting electrolytes are usable singly or at least two of them can be used in mixture. Among the examples of supporting electrolytes, LiCl is the most preferable.

In case that the concentration of supporting electrolyte in the solvent is too low, the liquid is almost unable to conduct electricity and the reaction does not proceed. In case that the concentration is too high, an excessive amount of lithium is deposited by reduction, which leads to cleavage of Si—Si bonds in the main chain, thereby reducing the molecular weight of the desired polysilane. Hence the concentration of supporting electrolyte in the solvent is preferably about 0.05 to about 5 mol/l, more preferably is about 0.1 to about 3 mol/l and most preferably about 0.15 to about 2.0 mol/l.

In the 1st invention of the present application, usable as anode is Mg or alloys principally containing Mg. Alloys containing Mg as the main component may contain about 3 to about 10% of Al. Examples of Mg alloys include, for example, 1st species (MgA1), 2nd species (MGA2) generally called "AZ63", 3rd species (MGA3), etc., all of which are specified in the Japanese Industrial Standards H6125-1961. Cathode materials are not limited insofar as electric current can flow. Examples of cathode materials are stainless steels such as SUS 304, SUS 316, etc.; various metals such as Mg, Cu, Zn, Al, Ni, Co, etc.; and carbon materials. The electrode shape is not limited insofar as electric current can stably flow. Preferred examples of the electrode shape are bar, plate, tube, cone, disc, ball or pellet contained in a basket, coiled plate, etc. If desired, oxide film is removed from the electrode surface prior to the reaction. The removal of oxide film from the electrode can be performed by any method, as by washing the electrode with an acid and subsequently washing with ethanol and ether and then drying it under reduced pressure, by polishing the electrode in a nitrogen atmosphere, or by conducting a combination of the above methods, etc.

The 1st invention of the present application can be carried out in various manners, among which the following two processes are preferable: Process (a) comprising charging dihalosilane of the general formula (1), the supporting electrolyte and the solvent into a static electrolytic cell with an anode and a cathode placed therein; subsequently applying a specific amount of electricity, preferably with stirring by mechanical or magnetic means; and thereby running the electrochemical reaction. Process (b), which are performed in a flow-type electrolytic cell system composed of an electrolytic cell with an anode and a cathode installed therein, an electrolyte tank, a pump, a pipe and so on, comprising charging the reaction solution consisting of halosilane, the supporting electrolyte and the solvent into the electrolyte tank; circulating the solution by pumping through the electrolytic cell system; subsequently applying a specific amount of electricity; and thereby undergoing the electrochemical reaction.

Figure 2:
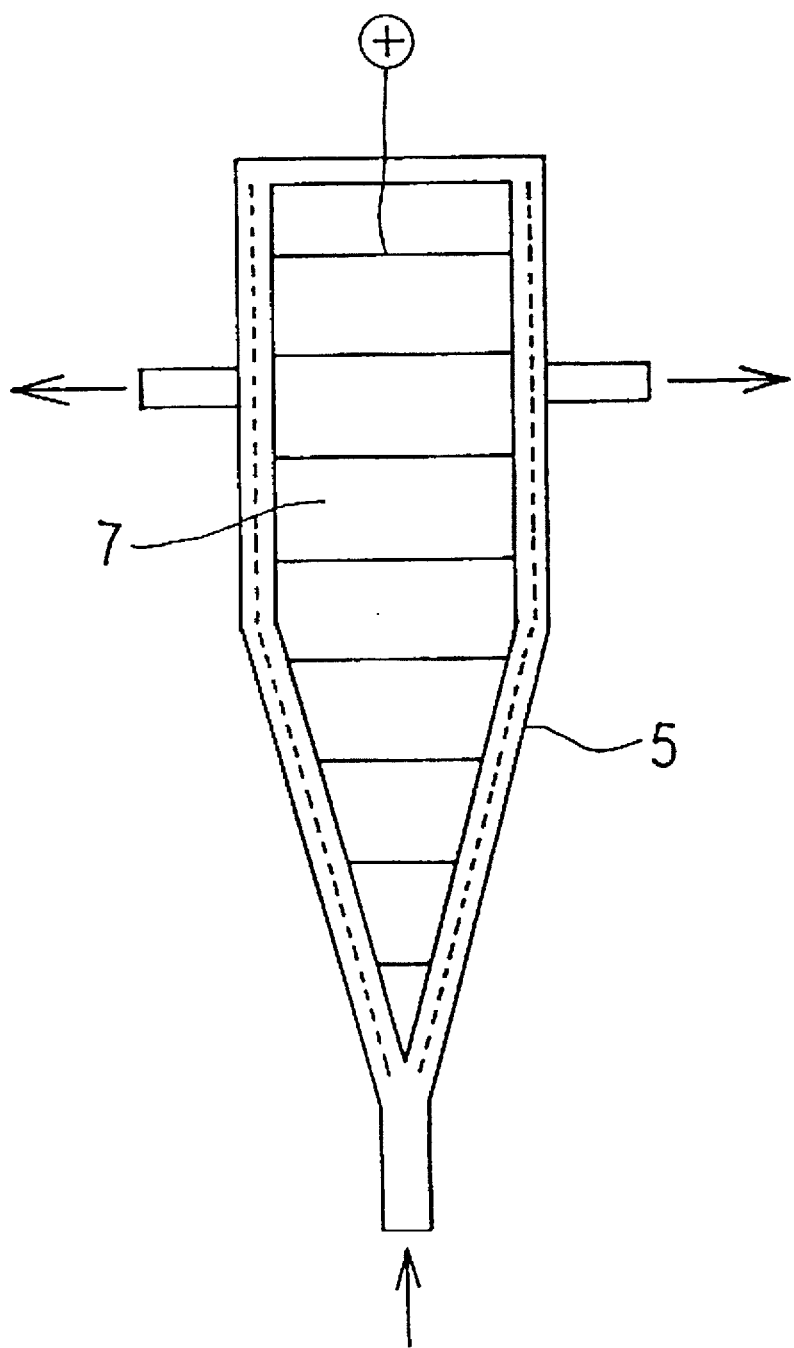
FIG. 2 is a cross sectional view illustrating an electrolytic cell which takes the shape of pencil sharpener usable in the method of the present invention.

The structure and shape of the electrolytic cell are not limited, but a preferred example is a structure which enables to supply easily the anode-constituting material which dissolves from the anode into the electrolyte and is gradually consumed as the reaction progresses. As shown in FIG. 1, the cell may have as an anode a basket or a basket-form container 1 containing small balls or pellets 3 and additional balls or pellets can be supplied from upside as the anode consumption progresses. As outlined in FIG. 2, usable also is a structure of the electrolytic cell designed to contain a layer of anode blocks 7 within a cathode sheet 5, pursuant to the example of "pencil sharpener form electrolytic cell" disclosed in the Japanese Unexamined Patent Publication No. 62-56589. Such electrolytic cells, devised to continuously supply anode elements, can dispense with exchange procedure of consumable electrodes per a reaction cycle or per several reaction cycles and therefore allows repeating reaction cycles for a long period of time. Thus the method lowers the expenses needed for exchanging anode, thereby reducing the cost for producing polysilanes.

The reactor or the reaction system preferably has a dry atmosphere, more preferably an atmosphere of dry nitrogen or inert gas, even more preferably an atmosphere consisting of deoxidized dry nitrogen or inert gas. An electric current is applied usually in an amount of over about 1 F/mol based on halogen content of dihalosilane, and the molecular weight of the product can be regulated through controlling the amount of electricity applied. After the polysilane is removed out of the system obtained by applying about 0.1 F/mol or more of electricity, the residual starting dihalosilane can be recovered and still reused. Since the reaction period varies depending on the amount of the starting dihalosilane and the resistance of electrolytic solution associated with the amount of supporting electrolyte or the like, the reaction period may be determined suitably. The reaction temperature is preferably in the range from −20° C. to the boiling point of the solvent used, more preferably from −5° to 30° C., most preferably from 0° to 25° C. The 1st invention of the present application may employ or can dispense with a diaphragm that is an essential element in the conventional electrode reduction reaction. Without the diaphragm, the 1st invention of the present application is easy to handle and it offers additional advantages in a practical use.

2. the 2nd invention of the present application

The 2nd invention of the present application is not substantially different from the 1st invention of the present application except that in order to undergo the electrochemical reaction of the present invention efficiently, in addition to the supporting electrolyte the current carrying aid is used to improve current conductivity.

Among the examples of current carrying aids, preferred are Al salts such as $AlCl_3$, $Al(OEt)_3$, etc; Fe salts such as $FeCl_2$, $FeCl_3$, etc.; Mg salts such as $MgCl_2$, etc.; Zn salts such as $ZnCl_2$, etc.; Sn salts such as $SnCl_2$, etc.; Co salts such as $CoCl_2$, etc.; Pd salts such as $PdCl_2$, etc.; V salts such as $VCl_3$, etc.; Cu salts such as $CuCl_2$, etc.; Ca salts such as $CaCl_2$, etc. These current carrying aids are usable singly or at least two of them can be used in mixture. Among the examples of current carrying aids given above, more preferred are $AlCl_3$, $FeCl_2$, $FeCl_3$, $COCl_2$, $CuCl_2$ etc. Too low a concentration of current carrying aid fails to ensure a satisfactory current passage. Contrarily, at too high a concentration, the aid itself is reduced and fails to participate in the reaction. A suitable concentration of current carrying aid in the solvent is usually about 0.01 to about 6 mol/l, more preferably about 0.03 to about 4 mol/l, most preferably about 0.05 to about 3 mol/l. The addition of such current carrying aids reduces the reaction period drastically and permits efficient production of polysilane. The reaction period can be reduced depending on the concentration of current carrying aid as well as the concentrations of supporting electrolyte and starting dihalosilane. Usually the time needed to complete the reaction is reduced by ¼ to ¾, compared with the reaction condition that does not employ current carrying aid.

3. the 3rd invention of the present application

In the 3rd invention of the present application halosilane used as the starting material is a compound of the general formula

(3)

(wherein R represents aromatic group, unsaturated aliphatic group, —$(CH_2)_m$— group or —$(CH_2$—$CH_2O)_m$— group [m is 1 to 20]; $R_1$, $R_2$, $R_3$ and $R_4$ are the same or different and represent hydrogen atom, alkyl group, aryl group, alkoxy group or amino group; X represents halogen atom).

The reaction product of the 3rd invention of the present application is a polymer of the following general formula containing Si—Si bonds in a main chain

(4)

(wherein $R_1$, $R_2$, $R_3$ and $R_4$ are as defined above; n is 20 to 10000).

The 3rd invention of the present application is not substantially different from the 1st invention of the present application except that the starting halosilane is a different kind of halosilane and correspondingly the reaction product obtained is a different kind of polymer (which contains Si—Si bonds in a main chain). According to the 3rd invention of the present application, polysilane of the general formula (4) is produced by subjecting the starting halosilane of the general formula (3) to electrochemical reaction as performed by the 1st invention of the present application.

In the general formula (3), the examples of structural components represented by R are the following:

a) divalent aromatic group such as phenylene, naphthalene, biphenylene represented by the general formula

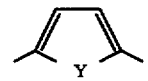
(11)

(wherein Y represents O, S, Se, Te or N);

b) divalent unsaturated aliphatic group such as ethenylene, ethynylene;

c) —$(CH_2)_m$— group [m is 1 to 20];

d) —$(CH_2$—$CH_2$—$O)_m$— group [m is 1 to 20].

In the general formula (3), hydrogen atom, amino group and organic substituents (alkyl group, aryl group, alkoxy group) represented by $R_1$, $R_2$, $R_3$ and $R_4$ are each different or at least two of them are the same. Examples of the alkyl groups as organic substituents are those having 1 to 10 carbon atoms, among which those of 1 to 6 carbon atoms are preferable. Examples of the aryl group include, for example, phenyl group, phenyl group substituted with at least one alkyl group of 1 to 6 carbon atoms, p-alkoxyphenyl group, naphthyl group, etc. Examples of the alkoxy group are those having 1 to 10 carbon atoms, among which those of 1 to 6 carbon atoms are more preferred. When $R_1$, $R_2$, $R_3$ and $R_4$ are amino group and organic substituents, at least one of the hydrogen atoms may be substituted with other functional group such as alkyl, aryl or alkoxy group.

In the halosilane of the general formula (3), X represents halogen atom (Cl, F, Br and I). Cl is more preferable as halogen atom.

In the method of the 3rd invention of the present application, halosilanes of the general formula (3) are usable singly or at least two of them can be used in mixture. Halosilane of the highest purity is preferably used. As a preliminary treatment for use, liquid halosilane is preferably dried over calcium hydride and then distilled, and solid halosilane is preferably purified by recrystallization.

4. the 4th invention of the present application

The 4th invention of the present application is not substantially different from the 3rd invention of the present application except that in order to run the electrochemical reaction of the present invention efficiently, in addition to the supporting electrolyte the current carrying aid is employed to improve current conductivity. Species and concentrations of the current carrying aids may be the same as that employed in the 2nd invention of the present application.

5. the 5th invention of the present application

In the 5th invention of the present application, the starting material is trihalosilane of the general formula $$RSiX_3 \quad (5)$$

(wherein R represents alkyl group, aryl group, alkoxy group or amino group; X represents halogen atom).

In the 5th invention of the present application, the reaction product is a silicon network polymer of the general formula

$$[RSi]_n \quad (6)$$

(wherein R is as defined above corresponding to the starting material; n is 20 to 10000).

The 5th invention of the present application is not substantially different from the 1st invention of the present application except that the starting material used is trihalosilane of the general formula (5) and correspondingly the polymer produced is a silicon network polymer of the general formula (6).

In the trihalosilane of the general formula (5), examples of the alkyl group are those having 1 to 10 carbon atoms, among which those of 1 to 6 carbon atoms are preferable. Examples of the aryl group include, for example, phenyl group, phenyl group substituted with at least one alkyl group of 1 to 6 carbon atoms, p-alkoxyphenyl group, naphthyl group, etc. Examples of the alkoxy group are those having 1 to 10 carbon atoms, among which those of 1 to 6 carbon atoms are preferred. When Rs are an amino group and organic substituents (alkyl, aryl or alkoxy group), at least one of hydrogen atoms may be further substituted with other functional group such as alkyl, aryl or alkoxy group.

In the general formula (5), X represents halogen atom (Cl, F, Br and I). Cl is more preferable as halogen atom.

In the method of the 5th invention of the present application, trihalosilanes of the general formula (5) are usable singly or at least two of them can be used in mixture. Trihalosilane of the highest purity is preferably used. As a preliminary treatment for use, liquid trihalosilane is preferably dried over calcium hydride and then distilled, and solid trihalosilane is preferably purified by recrystallization.

6. the 6th invention of the present application

The 6th invention of the present application is not substantially different from the 5th invention of the present application except that in order to proceed the electrochemical reaction of the present invention efficiently, in addition to the supporting electrolyte the current carrying aid is used to improve current conductivity. Species and concentrations of the current carrying aids may be the same as that used in the 2nd invention of the present application.

7. the 7th invention of the present application

In the 7th invention of the present application, the starting materials are dihalosilane of the above presented general formula (1) and trihalosilane of the above presented general formula (5).

The reaction product of the 7th invention of the present application is a network polymer containing Si—Si bonds in the backbone structure composed of a structural unit of the general formula

(wherein R is as defined above) and a structural unit of the general formula

$$RSi\equiv \quad (8)$$

The 7th invention of the present application is not substantially different from the 1st invention of the present application except that the starting material is a combination of at least one species of dihalosilanes of the general formula (1) and at least one species of trihalosilanes of the general formula (5) and correspondingly the polymer obtained is a network polymer composed of a structural unit of the general formula (7) and a structural unit of the general formula (8).

In the 7th invention of the present application, the mixing proportions of at least one species of dihalosilanes of the general formula (1) and at least one species of trihalosilanes of the general formula (5) are preferably dihalosilane (1): trihalosilane (5)=1000:1 to 50000. Within the above mixing proportions, the combined materials suitably dissolve in the organic solvent and the polymer obtained can preferably exhibit the conjugated characteristics performed by both polymers, i.e., polymer having straight chain structure and silicon network polymer having network structure.

The 7th invention of the present application provides a network polymer containing Si—Si bonds in the backbone structure, usually having a weight average molecular weight of about 2000 to about 1000000.

8. the 8th invention of the present application

The 8th invention of the present application is not substantially different from the 7th invention of the present application except that in order to run the electrochemical reaction of the present invention efficiently, in addition to the supporting electrolyte the current carrying aid is employed to improve current conductivity. Species and concentrations of current carrying aids may be the same as that employed in the 2nd invention of the present application.

The 8th invention of the present application provides a network polymer containing Si—Si bonds in the backbone structure, usually having a weight average molecular weight of about 2000 to about 1000000.

9. the 9th invention of the present application

In the 9th invention of the present application, the starting materials are dihalosilane of the above presented general formula (1) and tetrahalosilane of the general formula $$SiX_4 \quad (9)$$

(wherein X represents halogen atom).

The reaction product of the 9th invention of the present application is a network polymer containing Si—Si bonds in the backbone structure composed of a structural unit of the general formula (7) and a structural unit of the general formula $$Si\equiv \quad (10)$$

The 9th invention of the present application is not substantially different from the 1st invention of the present application except that the starting material is a combination of at least one species of dihalosilanes of the general formula (1) and at least one species of tetrahalosilanes of the general formula (9) and correspondingly the polymer afforded is a network polymer composed of a structural unit of the general formula (7) and a structural unit of the general formula (10).

In the 9th invention of the present application, the mixing proportions of at least one species of dihalosilanes of the general formula (1) and at least one species of tetrahalosilanes of the general formula (9) are preferably dihalosilane (1):tetrahalosilane (9)=1000:1 to 1000. Within the above mixing proportions, the combined materials suitably dissolve in the organic solvent and the polymer afforded can preferably exhibit the conjugated characteristics performed by both polymers, i.e., polymer having straight chain structure and silicon network polymer having network structure.

The 9th invention of the present application provides a network polymer containing Si—Si bonds in the backbone structure, usually having a weight average molecular weight of about 2000 to about 1000000.

10. the 10th invention of the present invention

The 10th invention of the present application is not substantially different from the 9th invention of the present application except that in order to undergo the electrochemical reaction of the present invention efficiently, in addition to the supporting electrolyte the current carrying aid is used to improve current conductivity. Species and concentrations of current carrying aids may be the same as that used in the 2nd invention of the present application.

The 10th invention of the present application provides a network polymer containing Si—Si bonds in the backbone structure, usually having a weight average molecular weight of about 2000 to about 1000000.

11. the 11th invention of the present application

In the 11th invention of the present application, the starting materials are trihalosilane of the above presented general formula (5) and tetrahalosialne of the above presented general formula (9).

The reaction product of the 11th invention of the present application is a network polymer containing Si—Si bonds in the backbone structure composed of a structural unit of the general formula (8) and a structural unit of the general formula (10).

The 11th invention of the present application is not substantially different from the 1st invention of the present application except that the starting material is a combination of at least one species of trihalosilanes of the general formula (5) and at least one species of tetrahalosilanes of the general formula (9) and correspondingly the polymer yielded is a network polymer composed of a structural unit of the general formula (8) and a structural unit of the general formula (10).

In the 11th invention of the present application, the mixing proportions of at least one species of trihalosilanes of the general formula (5) and at least one species of tetrahalosilanes of the general formula (9) are preferably trihalosilane (5):tetrahalosilane (9)=1000:1 to 100. Within the above mixing proportions, the combined materials suitably dissolve in the organic solvent and the polymer yielded can preferably exhibit the conjugated characteristics performed by both polymers, i.e., polymer having straight chain structure and silicon network polymer having network structure.

The 11th invention of the present application provides a network polymer containing Si—Si bonds in the backbone structure, usually having a weight average molecular weight of about 2000 to about 1000000.

12. the 12th invention of the present application

The 12th invention of the present application is not substantially different from the 11th invention of the present application except that in order to proceed the electrochemical reaction of the present invention efficiently, in addition to the supporting electrolyte the current carrying aid is employed to improve current conductivity. Species and concentrations of current carrying aids may be the same as that employed in the 2nd invention of the present application.

The 12th invention of the present application provides a network polymer containing Si—Si bonds in the backbone structure, usually having a weight average molecular weight of about 2000 to about 1000000.

13. the 13 invention of the present application

In the 13th invention of the present application, the starting materials are dihalosilane of the above presented general formula (1), trihalosilane of the above presented general formula (5) and tetrahalosilane of the above presented general formula (9).

The reaction product of the 13th invention of the present application is a network polymer containing Si—Si bonds in the backbone structure composed of a structural unit of the general formula (7), a structural unit of the general formula (8) and a structural unit of the general formula (10).

The 13th invention of the present application is not substantially different from the 1st invention of the present application except that the starting material is a combination of at least one species of dihalosilanes of the general formula (1), at least one species of trihalosilanes of the general formula (5) and at least one species of tetrahalosilanes of the general formula (9) and correspondingly the polymer afforded is a network polymer composed of a structural unit of the general formula (7), a structural unit of the general formula (8) and a structural unit of the general formula (10).

In the 13th invention of the present application, the mixing proportions of at least one species of dihalosilanes of the general formula (1), at least one species of trihalosilanes of the general formula (5) and at least one species of tetrahalosilanes of the general formula (9) are preferably dihalosilane (1):trihalosilane (5):tetrahalosilane (9)= 1000:0.5 to 800:0.5 to 100. Within the above mixing proportions, the combined materials suitably dissolve in the organic solvent and the produced polymer can preferably exhibit the conjugated characteristics performed by both polymers, i.e., polymer having straight chain structure and silicon network polymer having network structure.

The 13th invention of the present application provides a network polymer containing Si—Si bonds in the backbone structure, usually having a weight average molecular weight of about 2000 to about 1000000.

14. the 14th invention of the present application

The 14th invention of the present application is not substantially different from the 13th invention of the present application except that in order to run the electrochemical reaction of the present invention efficiently, in addition to the supporting electrolyte the current carrying aid is employed to improve current conductivity. Species and concentrations of current carrying aids may be the same as that employed in the 2nd invention of the present application.

The 14th invention of the present application provides a network polymer containing Si—Si bonds in the backbone structure, usually having a weight average molecular weight of about 2000 to about 1000000.

EFFECTS OF THE INVENTION

The present invention achieves remarkably improved effects as described below.

(a) The present invention affords a high yield of polysilanes having a uniform molecular weight and the degree of polymerization of over 30.

(b) The present invention provides polysilanes safely without producing environmental pollution since there is no need for using dangerous metals or carcinogenic solvents.

(c) The present invention produces polysilanes with a low cost since expensive supporting electrolytes are not used.

(d) When current carrying aid is employed, the present invention produces polysilanes efficiently in a shortened reaction period since the aid ensures good current passage during the reaction. In case of using the aid, the reaction period can be drastically shortened by ¼ to ¾, compared to the condition where the current carrying aid is not employed.

(e) In case that $AlCl_3$ or the like is used as current carrying aid, the electrolyte does not require neutralization after the reaction is completed, which offers an ease in the post-treatment.

EXAMPLES

The following examples are intended to illustrate the present invention in further detail.

Example 1

0.4 g of anhydrous lithium chloride (LiCl) was fed into a 30 ml-volume three-necked flask (hereinafter referred to as "reactor") equipped with a three-way cock, a Mg anode (1 cm in diameter×5 cm) and a stainless steel (SUS 304) cathode (1 cm×1 cm×5 cm). The reactor was heated to 50° C. under reduced pressure of 1 mmHg, thereby drying LiCl. Deoxidized dry nitrogen was charged into the reactor. Then 15 ml of tetrahydrofuran preliminarily dried over sodium-benzophenone ketyl was added. 1.6 ml (10 mmol) of methylphenyldichlorosilane preliminarily purified by distillation was added with a syringe. While the reaction mixture was stirred with a magnetic stirrer and the reactor was maintained at room temperature using a water bath, an electric current was applied from a constant-voltage source. The current was applied for about 31 hours to pass 1.8 F/mol of electricity based on the chlorine content of methylphenyldichlorosilane.

After completion of the reaction, 20 ml of a 1N solution of hydrochloric acid was added to the reaction solution, followed by the addition of 80 ml of distilled water. The resulting mixture was extracted with 100 ml of ether and subsequently reprecipitated by adding 80 ml of poor solvent ethanol and 4 ml of good solvent tetrahydrofuran, to thereby afford a product.

The result showed that methylphenylpolysilane with a weight average molecular weight of 12200 (average degree of polymerization: approximately 102) was obtained in a yield of 51.6%.

Methylphenylpolysilane thus obtained was dissolved into toluene to prepare a solution (the solute content was 10 wt %). From the solution thus prepared, 0.2 ml was taken and applied onto a glass plate by the casting method. Then the plate was dried at 50° C. under reduced pressure to give a thin film of polysilane. This thin film had a flat surface and good transparency without turbidity, crack and undulation, thereby meeting the requirements for optoelectronic materials.

Example 2

An electrochemical reaction was conducted in the same manner as in Example 1 with the exception that as dihalosilane of the general formula (1), 1.9 ml of cyclohexylmethyldichlorosilane purified by distillation was used.

After completion of the reaction, 20 ml of a 1 N solution of hydrochloric acid was added to the reaction solution, followed by the addition of 80 ml of distilled water. The resulting mixture was extracted with 100 ml of n-hexane and subsequently reprecipitated by adding 80 ml of poor solvent acetone and 4 ml of good solvent n-hexane, thereby giving a product.

The result showed that cyclohexylmethylpolysilane with a weight average molecular weight of 11500 (average degree of polymerization: approximately 91) was obtained in a yield of 61.2%.

Example 3

An electrochemical reaction was conducted in the same manner as in Example 1 with the exception that as dihalosilane of the general formula (1), 2.0 ml of n-hexylmethyldichlorosilane purified by distillation was used.

After completion of the reaction, 20 ml of a 1N solution of hydrochloric acid was added to the reaction solution, followed by the addition of 80 ml of distilled water. The resulting mixture was extracted with 100 ml of ether and subsequently reprecipitated by adding 80 ml of poor solvent acetone and 4 ml of good solvent n-hexane, to thereby yield a product.

The result showed that n-hexylmethylpolysilane with a weight average molecular weight of 10500 (average degree of polymerization: approximately 82) was obtained in a yield of 53.2%.

Example 4

An electrochemical reaction was conducted in the same manner as in Example 1 with the exception that as dihalosilane of the general formula (1), 1.5 ml of methoxymethyldichlorosilane purified by distillation was used.

After completion of the reaction, 20 ml of a 1N solution of hydrochloric acid was added to the reaction solution, followed by the addition of 80 ml of distilled water. The resulting mixture was extracted with 100 ml of ether and subsequently reprecipitated by adding 80 ml of poor solvent ethanol and 4 ml of good solvent tetrahydrofuran (THF), thereby affording a product.

The result showed that methoxymethylpolysilane with a weight average molecular weight of 3900 (average degree of polymerization: approximately 73) was obtained in a yield of 23%.

Example 5

An electrochemical reaction was conducted in the same manner as in Example 1 with the exception that starting dihalosilane of the general formula (1) was 1.9 ml of p-anisylmethyldichlorosilane purified by distillation.

After completion of the reaction, 20 ml of a 1N solution of hydrochloric acid was added to the reaction solution, followed by the addition of 80 ml of distilled water. The resulting mixture was extracted with 100 ml of ether and subsequently reprecipitated by adding 80 ml of poor solvent ethanol and 4 ml of good solvent THF, thereby giving a product.

The result showed that p-anisylmethylpolysilane with a weight average molecular weight of 9900 (average degree of polymerization: approximately 66) was obtained in a yield of 51.1%.

Example 6

An electrochemical reaction was conducted in the same manner as in Example 1 with the exception that starting dihalosilane of the general formula (1) was 1.5 ml of 1,2-dichloro-1,1,2-trimethyl-2-phenyldisilane purified by distillation.

After completion of the reaction, 20 ml of a 1N solution of hydrochloric acid was added to the reaction solution, followed by the addition of 80 ml of distilled water. The resulting mixture was extracted with 100 ml of ether and subsequently reprecipitated by adding 80 ml of poor solvent ethanol and 4 ml of good solvent THF, thereby affording a product.

A corresponding polysilane having a high molecular weight was obtained in a high yield.

Example 7

An electrochemical reaction was conducted in the same manner as in Example 1 with the exception that as starting dihalosilane of the general formula (1), methylphenyldibromosilane was used.

Methylphenylpolysilane was obtained in a yield of 42.1% (average degree of polymerization: approximately 85) with a weight average molecular weight of 10200.

Example 8

Methylphenyldichlorosilane was subjected to electrochemical reaction in the same manner as in Example 1 with the exception that Mg alloy (Mg 90%, Al 9%, Zn 1%; 1 cm×1 cm×5 cm) was used as anode.

Methylphenylpolysilane was given in a yield of 55.3% (average degree of polymerization: approximately 128) with a weight average molecular weight of 15300.

Example 9

Methylphenyldichlorosilane was subjected to electrochemical reaction in the same manner as in Example 1 with the exception that Mg alloy (Mg 89.5%, Al 3%, Zn 1%, Mn 0.5%; 1 cm×1 cm×5 cm) was used as anode.

Methylphenylpolysilane was obtained in a yield of 61.3% (average degree of polymerization: approximately 102) with a weight average molecular weight of 12200.

Example 10

An electrochemical reaction using methylphenyldichlorosilane as starting material was conducted in the same manner as in Example 1 with the exception that the cathode was glassy carbon (1 cm×0.1 cm×5 cm). Methylphenylpolysilane having a high molecular weight was afforded in a high yield.

Example 11

Methylphenyldichlorosilane was subjected to electrochemical reaction in the same manner as in Example 1 with the exception that 0.65 g of lithium nitrate was used as supporting electrolyte. Methylphenylpolysilane having a high molecular weight was obtained in a high yield.

Example 12

An electrochemical reaction using methylphenyldichlorosilane as starting material was conducted in the same manner as Example 1 with the exception, that 0.70 g of lithium carbonate was used as supporting electrolyte. Methylphenylpolysilane having a high molecular weight was afforded in a high yield.

Example 13

0.40 g of anhydrous lithium chloride (LiCl) and 0.25 g of anhydrous aluminum chloride ($AlCl_3$) were fed into a 30 ml-volume three-necked flask (hereinafter referred to as "reactor") equipped with a three-way cock, a Mg anode (1 cm in diameter×5 cm) and a stainless steel (SUS 316) cathode (1 cm×1 cm×5 cm). The reactor was heated to 50° C. under reduced pressure of 1 mmHg, to thereby dry LiCl and $AlCl_3$. Deoxidized dry nitrogen was charged into the reactor. Then 15 ml of tetrahydrofuran preliminarily dried over sodium-benzophenone ketyl was added. 1.6 ml (10 mmol) of methylphenyldichlorosilane preliminarily purified by distillation was added with a syringe. While the reaction mixture was stirred with a magnetic stirrer and the reactor was maintained at room temperature using a water bath, an electric current was applied from a constant-voltage source. The current was applied for about 10 hours to pass 1.8 F/mol of electricity based on the chlorine content of methylphenyldichlorosilane.

After completion of the reaction, 20 ml of a 1N solution of hydrochloric acid was added to the reaction solution, followed by the addition of 80 ml of distilled water. The resulting mixture was extracted with 100 ml of ether and subsequently reprecipitated by adding 80 ml of poor solvent ethanol and 4 ml of good solvent tetrahydrofuran, thereby yielding a product.

The result showed that methylphenylpolysilane with a weight average molecular weight of 17100 (average degree of polymerization: approximately 143) was given in a yield of 54.8%.

Example 14

Methylphenyldichlorosilane was subjected to electrochemical reaction in the same manner as in Example 13 with the exception that the amount of LiCl used was 0.8 g. It took about 9 hours for the passed electricity to reach 1.8 F/mol based on the chlorine content of the starting material.

As a result, methylphenylpolysilane was obtained in a yield of 40.6% (average degree of polymerization: approximately 203) with a weight average molecular weight of 24300.

Example 15

An electrochemical reaction using methylphenyldichlorosilane as starting material was conducted in the same manner as in Example 13 with the exception that 0.18 g of $MgCl_2$ was used as current carrying aid. It took about 15 hours for the passed electricity to reach 1.8 F/mol based on the chlorine content of the starting material.

The result showed that methylphenylpolysilane was obtained in a yield of 47.5% (average degree of polymerization: approximately 83) with a weight average molecular weight of 9900.

Example 16

Methylphenyldichlorosilane was subjected to electrochemical reaction in the same manner as in Example 13 with the exception that 0.26 g of $ZnCl_2$ was used as current carrying aid. It took about 17 hours for the passed electricity to reach 1.8 F/mol based on the chlorine content of the starting material.

As a result, methylphenylpolysilane was obtained in a yield of 43.1% (average degree of polymerization: approximately 88) with a weight average molecular weight of 10500.

Example 17

An electrochemical reaction using methylphenyldichlorosilane as starting material was conducted in the same manner as in Example 13 with the exception that current carrying aid was 0.52 g of $CaCl_2$. It took about 20 hours for the passed electricity to reach 1.8 F/mol based on the chlorine content of the starting material.

Methylphenylpolysilane was given in a yield of 49.0% (average degree of polymerization: approximately 71) with a weight average molecular weight of 8550.

Example 18

Methylphenyldichlorosilane was subjected to electrochemical reaction in the same manner as in Example 13 with the exception that the solvent was 15 ml of DME preliminarily dried over sodium-benzophenone ketyl.

Methylphenylpolysilane was obtained in a yield of 39.5% (average degree of polymerization: approximately 63) with a weight average molecular weight of 7600.

Example 19

An electrochemical reaction was conducted in the same manner as in Example 13 with the exception that 6.4 ml of methylphenyldichlorosilane purified by distillation was used as starting dihalosilane.

Methylphenylpolysilane was afforded in a yield of 48.5% (average degree of polymerization: approximately 332) with a weight average molecular weight of 39800.

Example 20

An electrochemical reaction was conducted in the same manner as in Example 13 with the exception that 1.3 ml of 1,4-bis(methylphenylchlorosilyl)benzene purified by distillation was used as starting halosilane.

Poly[p-(disilanilene)phenylene] was produced in a yield of 33.9% (average degree of polymerization: approximately 41) with a weight average molecular weight of 11300.

Example 21

An electrochemical reaction was conducted in the same manner as in Example 13 with the exception that phenyltrichlorosilane purified by distillation was used as starting halosilane. Electricity was passed to reach 2.0 F/mol based on the chlorine content of the starting material.

As a result, a silicon network polymer was produced in a yield of 41.5% (average degree of polymerization: approximately 124) with a weight average molecular weight of 13000.

Example 22

An electrochemical reaction was conducted in the same manner as in Example 13 with the exception that cyclohexyltrichlorosilane purified by distillation was used as starting halosilane. Electricity was passed to reach 2.0 F/mol based on the chlorine content of the starting material.

As a result, a silicon network polymer was afforded in a yield of 62.3% (average degree of polymerization: approximately 102) with a weight average molecular weight of 11300.

Example 23

An electrochemical reaction was conducted in the same manner as in Example 13 with the exception that starting halosilane was a combination of 45 ml of methylphenyldichlorosilane and 0.16 ml of phenyltrichlorosilane, both preliminarily purified by distillation. Electricity was passed to reach 2.0 F/mol based on the chlorine content of the starting materials.

The result showed that a network polymer was obtained containing Si—Si bonds in the backbone structure having a weight average molecular weight of 8050 in a yield of 61.5%.

Example 24

An electrochemical reaction was conducted in the same manner as in Example 13 with the exception that a combination of 1.13 ml of methylphenyldichlorosilane and 0.34 ml of tetrachlorosilane, both preliminarily purified by distillation, was used as starting material. Electricity was passed to reach 2.0 F/mol based on the chlorine content of the starting materials.

The result showed that a network polymer containing Si—Si bonds in the backbone structure having a weight average molecular weight of 7700 was produced in a yield of 38.5%.

Example 25

An electrochemical reaction was conducted in the same manner as in Example 13 with the exception that starting material was a combination of 1.60 ml of phenyltrichlorosilane and 0.06 ml of tetrachlorosilane, both preliminarily purified by distillation. Electricity was passed to reach 2.0 F/mol based on the chlorine content of the starting materials.

As a result, a network polymer was obtained containing Si—Si bonds in the backbone structure having a weight average molecular weight of 7200 in a yield of 34.0%.

Example 26

An electrochemical reaction was conducted in the same manner as in Example 13 with the exception that a combination of 1.60 ml of methylphenyldichlorosilane, 0.16 ml of phenyltrichlorosilane and 0.06 ml of tetrachlorosilane, all preliminarily purified by distillation, was used as starting halosilane. Electricity was passed to reach 2.0 F/mol based on the chlorine content of the starting materials.

The result showed that a network polymer containing Si—Si bonds in the backbone structure having a weight average molecular weight of 8100 was given in a yield of 52.2%.

Example 27

Methylphenyldichlorosilane was subjected to electrochemical reaction in the same manner as in Example 13 with the exception that 0.24 g of $FeCl_2$ was used as current carrying aid. It took about 11 hours for the passed electricity to reach 1.8 F/mol based on the chlorine content of the starting material.

As a result, methylphenylpolysilane was obtained in a yield of 60.5% (average degree of polymerization: approximately 186) with a weight average molecular weight of 22300.

Example 28

An electrochemical reaction using methylphenyldichlorosilane as starting material was conducted in the same manner as in Example 13 with the exception that current carrying aid was 0.31 g of $FeCl_3$. It took about 12 hours for the passed electricity to reach 1.8 F/mol based on the chlorine content of the starting material. As a result, methylphenylpolysilane was obtained in a yield of 43.7% (average degree of polymerization: approximately 125) with a weight average molecular weight of 15000.

Example 29

Methylphenyldichlorosilane was subjected to electrochemical reaction in the same manner as in Example 13 with the exception that 0.49 g of $SnCl_2$ was used as current carrying aid. It took about 22 hours for the passed electricity to reach 1.8 F/mol based on the chlorine content of the starting material.

As a result, methylphenylpolysilane was obtained in a yield of 56.2% (average degree of polymerization: approximately 76) with a weight average molecular weight of 9100.

Example 30

An electrochemical reaction was conducted in the same manner as in Example 13 with the exception that 0.24 g of $CoCl_2$ was used as current carrying aid. It took about 17 hours for the passed electricity to reach 1.8 F/mol based on the chlorine content of the starting material.

The result showed that methylphenylpolysilane with a weight average molecular weight of 13000 (average degree of polymerization: approximately 108) was given in a yield of 61.8%.

Example 31

An electrochemical reaction using methylphenyldichlorosilane as starting material was conducted in the same manner as in Example 13 with the exception that current carrying aid was 0.33 g of $PdCl_2$. It took about 23 hours for the passed electricity to reach 1.8 F/mol based on the chlorine content of the starting material. As a result, methylphenylpolysilane with a weight average molecular weight of 7400 (average degree of polymerization: approximately 61) was afforded in a yield of 36.7%.

Example 32

Methylphenyldichlorosilane was subjected to electrochemical reaction in the same manner as in Example 13 with the exception that 0.29 g of $VCl_3$ was used as current carrying aid. It took about 23 hours for the passed electricity to reach 1.8 F/mol based on the chlorine content of the starting material. As a result, methylphenylpolysilane was obtained in a yield of 26.4% with a weight average molecular weight of 15700 (average degree of polymerization: approximately 131).

Example 33

An electrochemical reaction was conducted in the same manner as in Example 13 with the exception that 0.25 g of $CuCl_2$ was used as current carrying aid. It took about 18 hours for the passed electricity to reach 1.8 F/mol based on the chlorine content of the starting material. The result showed that methylphenylpolysilane with a weight average molecular weight of 10400 (average degree of polymerization: approximately 86) was given in a yield of 41.8%.

Example 34

27 g of anhydrous lithium chloride (LiCl) and 17 g of anhydrous aluminum chloride ($AlCl_3$) were fed into the electrolyte tank of the flow-type electrolytic cell system. The system was composed of a filterpress-type electrolytic cell (distance between the electrodes: 5 mm) equipped with a Mg anode (12 cm×15 cm×1 cm) and a stainless steal (SUS 316) cathode (12 cm×15 cm×1 cm), a 3-volume electrolyte tank, a bellows-type pump and circulation pipes. The system was heated to 50° C. under reduced pressure of 1 mmHg, to thereby dry LiCl and $AlCl_3$. Deoxidized dry nitrogen was introduced into the electrolytic cell system. Then 1.0 l of tetrahydrofuran preliminarily dried over sodium-benzophenone ketyl was added. 107.9 ml (0.67 mol) of methylphenyldichlorosilane preliminarily purified by distillation was added. While circulating the electrolyte by means of the bellows-type pump (linear velocity between the electrodes: 20 cm/sec.) and maintaining the reaction temperature at room temperature by means of a cooler, an electric current was applied with a constant-voltage source. The current was applied for about 36 hours to pass 1.8 F/mol of electricity based on the chlorine content of starting material.

After completion of the reaction, 1.5 l of distilled water was added to the electrolyte. Then the mixture was extracted with 1.5 l of ether, followed by reprecipitation by adding 2 l of poor solvent ethanol and 50 ml of good solvent benzene, to thereby yield a product.

The result showed that methylphenylpolysilane with a weight average molecular weight of 18500 (average degree of polymerization: approximately 154) was obtained in a yield of 39.9%.

Example 35

Figure 3:
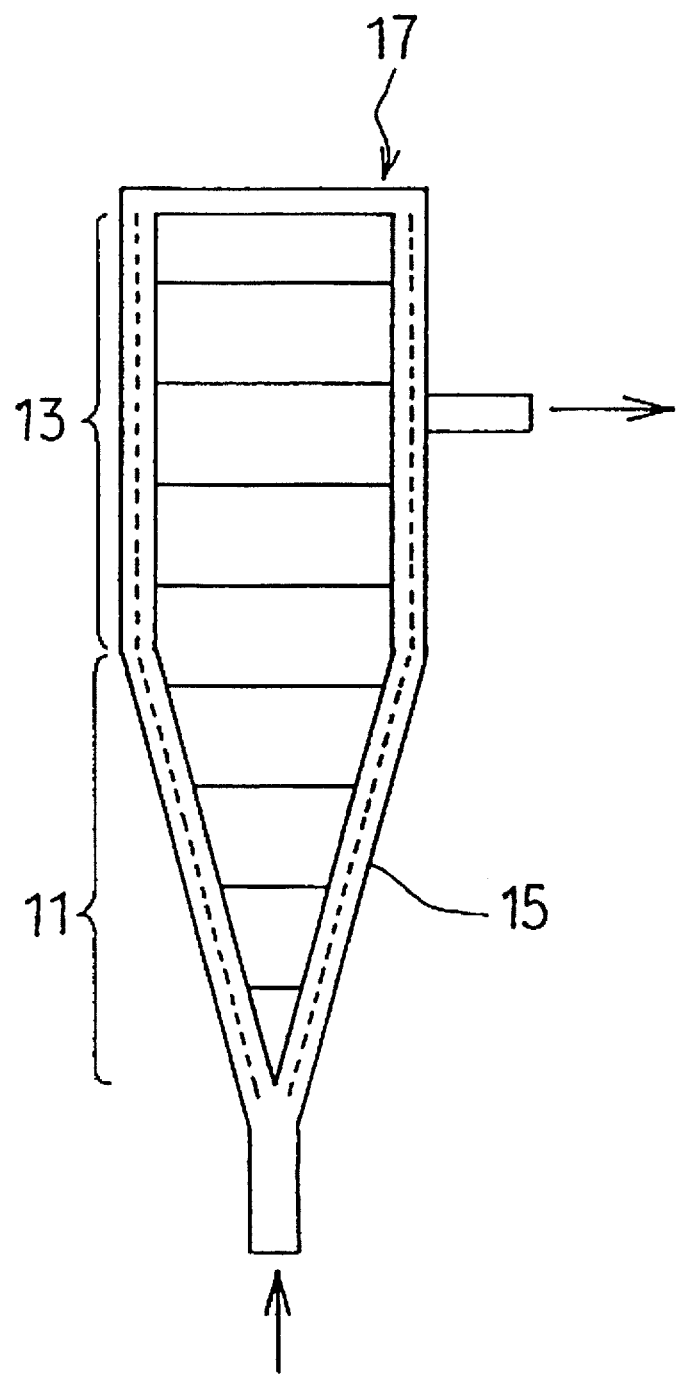
FIG. 3 is a cross sectional view schematically showing an electrolytic cell in the shape of a pencil sharpener used in the Examples of the present invention.

The method of the present invention was carried out using the pencil sharpener form electrolytic cell as illustrated in FIG. 3. A pencil sharpener form electrolytic cell 17 containing an anode of built-up bodies made of magnesium composed of cone 11 (105 cm in height×22 cm in diameter) and cylinder 13 (22 cm in diameter×45 cm in thickness, composed of three blocks each 15 cm in thickness) and a cathode sheet 15 made of SUS 304 (the sheet partly constituted the external wall of the electrolytic cell) placed at 5 mm distance from the anode cone 11; a 20 l-volume electrolyte tank (which is not illustrated in the drawing); circulation pumps and pipes (which are not illustrated in the drawing) and so on were equipped as primary components in the flow-type electrolytic cell system. 400 g of anhydrous lithium chloride (LiCl) and 250 g of anhydrous ferrous chloride (FeCl$_2$) were fed into the cell. The system was heated to 50° C. under reduced pressure of 1 mmHg, to thereby dry LiCl and FeCl$_2$. Deoxidized dry nitrogen was introduced into the system. Then 15 l of dried tetrahydrofuran was added. Into the mixture, 1.5 kg of methylphenyldichlorosilane was added. While circulating the electrolyte in the direction of the arrow by means of a circulation pump (linear velocity at the intermediate point between the electrodes: 20 cm/sec.) and maintaining the reaction temperature at room temperature by means of a cooler, constant-current electrolysis was conducted at a current value of 34 A. The current was applied for about 22 hours to pass 3.5 F/mol of electricity based on the starting material.

After completion of the reaction, the electrolyte was washed, extracted and reprecipitated in accordance with the conventional method to yield 385 g of methylphenylpolysilane.

Observation of the Mg electrode consumption after the reaction indicated that the Mg electrode was consumed and shortened by about 5 mm at the upper end. In view of the extent of the consumption, it is apparent that the upper portion of the cylinder 13 constituting Mg anode 45 cm in height (three blocks each 15 cm in height) will be consumed completely and thus there will be a need to supply another Mg block only after the above reaction cycle will be repeated about 90 times.

Example 36

Figure 4:
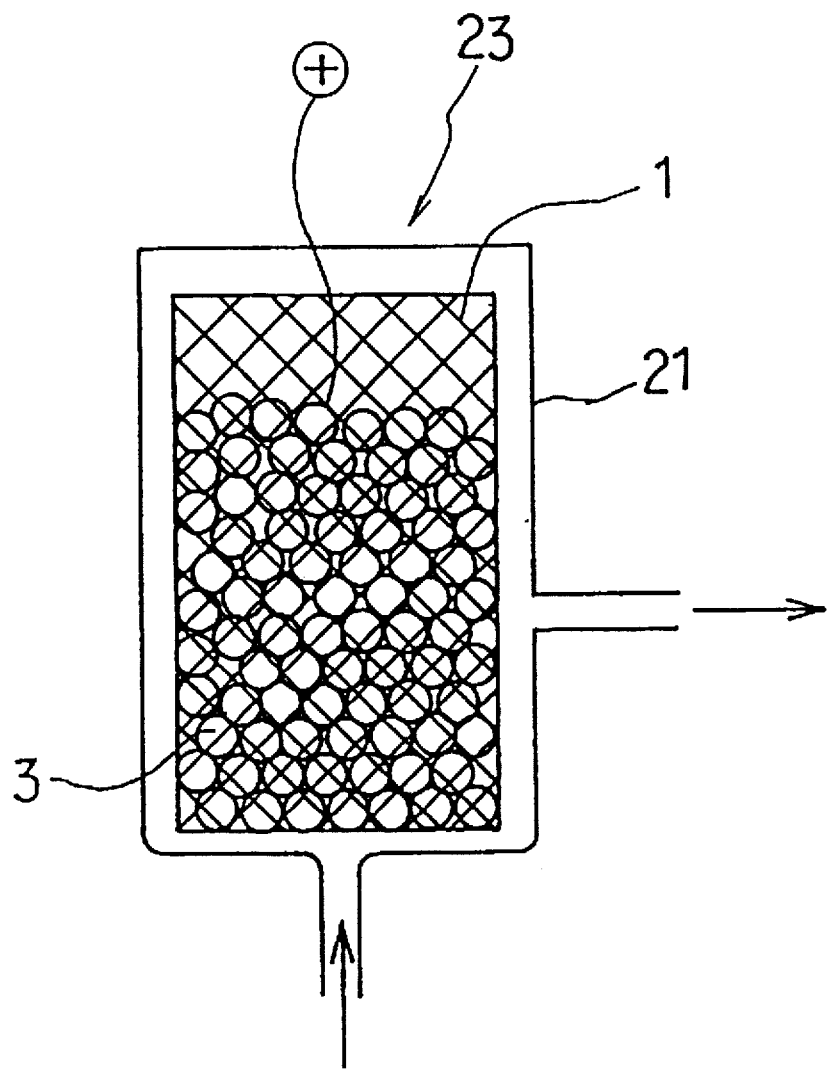
FIG. 4 is a cross sectional view schematically showing an electrolytic cell employing magnesium balls placed in a basket as consumable anode.

The method of the present invention was performed using an anode of the type illustrated in FIG. 1 and an electrolytic cell of the type illustrated in FIG. 4. The electrolytic cell 23 containing as an anode Mg balls 3 (diameter: 1 cm) placed in a basket 1 made of PTFE (20 cm in diameter×40 cm in height) up to 35 cm high from the bottom of the basket and a cathode of cylinder-type container 21 made of SUS 304, placed at 5 mm distant from the anode basket 1; a 20 l-volume of electrolyte tank (which is not illustrated in the drawing); circulation pumps and pipes (which are not illustrated in the drawing) and so on were equipped as primary components in the flow-type electrolytic cell system. Into the system, 400 g of anhydrous lithium chloride (LiCl) and 250 g of anhydrous ferrous chloride (FeCl$_2$) were fed. The system was heated to 50° C. under reduced pressure of 1 mmHg, to thereby dry LiCl and FeCl$_2$. Deoxidized dry nitrogen was introduced into the system. Then 15 l of dried tetrahydrofuran was added. Into the mixture, 1.5 kg of methylphenyldichlorosilane was added. While circulating the electrolyte in the direction of the arrow by means of the circulation pump (linear velocity between the electrodes: 20 cm/sec.) and maintaining the reaction temperature at room temperature by means of a cooler, constant-current electrolysis was conducted at a current value of 34 A. The current was applied for about 22 hours to pass 3.5 F/mol of electricity based on the starting material.

After completion of the reaction, the electrolyte was washed, extracted and reprecipitated in accordance with the conventional method to give 339 g of methylphenylpolysilane.

Observation of the Mg electrode consumption after the reaction indicated that the Mg electrode was consumed and shortened by about 1 cm at the upper end. In view of the extent of the consumption, it is apparent that the height of Mg balls was lowered from the upper end by one third and thus there is no need to supply another Mg ball until the above reaction is repeated about 70 times.

We claim:

1. A method for producing polysilane characterized in that dihalosilane of the general formula

wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in the case of m=3; X represents halogen atoms is subjected to electrochemical reaction in the presence of Mg or Mg alloy as anode, at least one lithium salt selected from the group consisting of LiCl, LiNO$_3$ and Li$_2$CO$_3$ as supporting electrolyte and aprotic solvent as solvent, thereby producing polysilane of the general formula

wherein R is as defined above corresponding to the starting material; n is 20 to 10000.

2. A method for producing polysilane characterized in that dihalosilane of the general formula

wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom is subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing polysilane of the general formula

wherein R is as defined above corresponding to the starting material; n is 20 to 10000.

3. A method according to claim 1 wherein the supporting electrolyte is LiCl.

4. A method according to claim 2 wherein the current carrying aid is AlCl$_3$, FeCl$_2$, FeCl$_3$, COCl$_2$ or CuCl$_2$.

5. A method for producing polysilane characterized in that a compound of the general formula

wherein R represents aromatic group, unsaturated aliphatic group, —(CH$_2$)$_m$— group or —(CH$_2$—CH$_2$—O)$_m$— group m is 1 to 20; R$_1$, R$_2$, R$_3$ and R$_4$ are the same or different and represent hydrogen atom, alkyl group, aryl group, alkoxy group or amino group; X represents halogen atom is subjected to electrochemical reaction in the presence of Mg or Mg alloy as anode, at least one lithium salt selected from the group consisting of LiCl, LiNO₃ and Li₂CO₃ as supporting electrolyte and aprotic solvent as solvent, thereby producing a polymer of the following general formula containing Si—Si bonds in a main chain

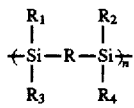
(4)

wherein $R_1$, $R_2$, $R_3$ and $R_4$ are as defined above; n is 20 to 10000.

6. A method for producing polysilane characterized in that a compound of the general formula

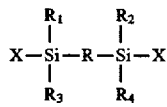
(3)

wherein R represents aromatic group, unsaturated aliphatic group, —(CH₂)ₘ— group or —(CH₂—CH₂—O)ₘ— group m is 1 to 20; $R_1$, $R_2$, $R_3$ and $R_4$ are the same or different and represent hydrogen atom, alkyl group, aryl group, alkoxy group or amino group; X represents halogen atom is subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a polymer of the following general formula
containing Si—Si bonds in a main chain

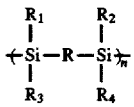
(4)

wherein $R_1$, $R_2$, $R_3$ and $R_4$ are as defined above; n is 20 to 10000.

7. A method according to claim 5 wherein the supporting electrolyte is LiCl.

8. A method according to claim 6 the current carrying aid is AlCl₃ FeCl₂, FeCl₃, CoCl₂ or CuCl₂.

9. A method for producing polysilane characterized in that trihalosilane of the general formula

RSiX₃ (5)

wherein R represents hydrogen atom, alkyl group, aryl group, alkoxy group or amino group; X represents halogen atom is subjected to electrochemical reaction in the presence of Mg or Mg alloy as anode, at least one lithium salt selected from the group consisting of LiCl, LiNO₃ and Li₂CO₃ as supporting electrolyte and aprotic solvent as solvent, thereby producing a silicon network polymer of the general formula

(RSi)ₙ (6)

wherein R is as defined above corresponding to the starting material; n is 20 to 10000.

10. A method for producing polysilane characterized in that trihalosilane of the general formula

RSiX₃ (5)

wherein R represents hydrogen atom, alkyl group, aryl group, alkoxy group or amino group; X represents halogen atom) is subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a silicon network polymer of the general formula

[RSi]ₙ (6)

wherein R is as defined above corresponding to the starting material; n is 20 to 10000.

11. A method according to claim 9 wherein the supporting electrolyte is LiCl.

12. A method according to claim 10 wherein the current carrying aid is AlCl₃, FeCl₂, FeCl₃, CoCl₂ or CuCl₂.

13. A method for producing polysilane characterized in that dihalosilane of the general formula

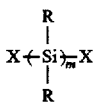
(1)

wherein m is to 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom and trihalosilane of the general formula

RSiX₃ (5)

wherein R represents hydrogen atom, alkyl group, aryl group, alkoxy group or amino group; X represents halogen atom are subjected to electrochemical reaction in the presence of Mg or Mg alloy as anode at least one lithium salt selected from the group consisting of LiCl, LiNO₃ and Li₂CO₃ as supporting electrolyte and aprotic solvent as solvent, thereby producing a network polymer containing Si—Si bonds in the backbone structure composed of a structural unit of the general formula

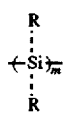
(7)

wherein R and m are as defined above
and a structural unit of the general formula

RSi≡ (8)

wherein R is as defined above.

14. A method for producing polysilane characterized in that dihalosilane of the general formula

(1)

wherein m is 1 to 3; represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom and trihalosilane of the general formula

RSiX₃ (5)

wherein R represents hydrogen atom, alkyl group, aryl group, alkoxy group or amino group; X represents halogen atom are subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula

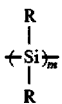 (7)

wherein R is as defined above and a structural unit of the general formula

RSi≡ (8)

wherein R is as defined above.

15. A method according to claim 13 wherein the supporting electrolyte is LiCl.

16. A method according to claim 14, wherein the current carrying aid is AlCl$_3$, FeCl$_2$, FeCl$_3$, CoCl$_2$ or CuCl$_2$.

17. A method for producing polysilane characterized in that dihalosilane of the general formula

 (1)

wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom and tetrahalosilane of the general formula SiX$_4$ (9)

wherein X represents halogen atom are subjected to electrochemical reaction in the presence of Mg or Mg alloy as anode, lithium salt as supporting electrolyte and aprotic solvent as solvent, thereby producing a network polymer containing Si—Si bonds in the backbone structure composed of a structural unit of the general formula

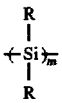 (7)

wherein R and m are as defined above
and a structural unit of the general formula Si≡ (10).

18. A method for producing polysilane characterized in that dihalosilane of the general formula

 (1)

wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom and tetrahalosilane of the general formula SiX$_4$ (9)

wherein X represents halogen atom are subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula

 (7)

wherein R and m are as defined above
and a structural unit of the general formula Si≡ (10).

19. A method according to claim 17 wherein the supporting electrolyte is LiCl.

20. A method according to claim 18 wherein the current carrying aid is AlCl$_3$, FeCl$_2$, FeCl$_3$, CoCl$_2$, or CuCl$_2$.

21. A method for producing polysilane characterized in that trihalosilane of the general formula RSiX$_3$ (5)

wherein R represents hydrogen atom, alkyl group, aryl group, alkoxy group or amino group; X represents halogen atom
and tetrahalosilane of the general formula SiX$_4$ (9)

wherein X represents halogen atom are subjected to electrochemical reaction in the presence of Mg or Mg alloy as anode, lithium salt as supporting electrolyte and aprotic solvent as solvent, thereby producing a network polymer containing Si—Si bonds in the backbone structure composed of a structural unit of the general formula RSi≡ (8)

wherein R is as defined above
and a structural unit of the general formula

Si≡ (10).

22. A method for producing polysilane characterized in that trihalosilane of the general formula RSiX$_3$ (5)

wherein R represents hydrogen atom, alkyl group, aryl group, alkoxy group or amino group; X represents halogen atom
and tetrahalosilane of the general formula SiX$_4$ (9)

wherein X represents halogen atom are subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula $$RSi\equiv \quad (8)$$

wherein R is as defined above
and a structural unit of the general formula $$Si\equiv \quad (10).$$

23. A method according to claim 21 wherein the supporting electrolyte is LiCl.

24. A method according to claim 22 wherein the current carrying aid is $AlCl_3$, $FeCl_2$, $FeCl_3$, $CoCl_2$, or $CuCl_2$.

25. A method for producing polysilane characterized in that dihalosilane of the general formula $$X\!-\!(Si)_m\!-\!X \quad (1)$$
with R substituents wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom, trihalosilane of the general formula $$RSiX_3 \quad (5)$$

wherein R represents alkyl group, aryl group, alkoxy group or amino group; X represents halogen atom
and tetrahalosilane of the general formula $$SiX_4 \quad (9)$$

wherein X represents halogen atom are subjected to electrochemical reaction in the presence of Mg or Mg alloy as anode, lithium salt as supporting electrolyte and aprotic solvent as solvent, thereby producing a network polymer containing Si—Si bonds in the backbone structure composed of a structural unit of the general formula $$-(Si)_m- \quad (7)$$
with R substituents wherein R and m are as defined above,
a structural unit of the general formula $$RSi\equiv \quad (8)$$

wherein R is as defined above
and a structural unit of the general formula $$Si\equiv \quad (10).$$

26. A method for producing polysilane characterized in that dihalosilane of the general formula $$X\!-\!(Si)_m\!-\!X \quad (1)$$
with R substituents wherein m is 1 to 3; R represents hydrogen atom, alkyl group, aryl group, alkoxy group or amino group and two Rs are the same or different in case of m=1, four Rs are the same or at least two of them are different in case of m=2 and six Rs are the same or at least two of them are different in case of m=3; X represents halogen atom, trihalosilane of the general formula $$RSiX_3 \quad (5)$$

wherein R represents alkyl group, aryl group, alkoxy group or amino group; X represents halogen atom and tetrahalosilane of the general formula $$SiX_4 \quad (9)$$

wherein X represents halogen atom are subjected to electrochemical reaction in the presence of Mg or Mg alloy as anode, lithium salt as supporting electrolyte, Al salt, Fe salt, Mg salt, Zn salt, Sn salt, Co salt, Pd salt, V salt, Cu salt or Ca salt as current carrying aid and aprotic solvent as solvent, thereby producing a network polymer containing Si—Si bonds in the backbone structure composed of a structural unit of the general formula $$-(Si)_m- \quad (7)$$
with R substituents wherein R and m are as defined above,
a structural unit of the general formula $$RSi\equiv \quad (8)$$

wherein R is as defined above
and a structural unit of the general formula $$Si\equiv \quad (10).$$

27. A method according to claim 25 wherein the supporting electrolyte is LiCl.

28. A method according to claim 26 wherein the current carrying aid is $AlCl_3$, $FeCl_2$, $FeCl_3$, $CoCl_2$ or $CuCl_2$.

* * * * *

UNITED STATES PATENT AND TRADEMARK OFFICE
CERTIFICATE OF CORRECTION

PATENT NO. : 5,641,849
DATED : June 24, 1997
INVENTOR(S) : NISHIDA et al

It is certified that error appears in the above-indentified patent and that said Letters Patent is hereby corrected as shown below:

Title page, item [75] should read as follows:

--[75] Inventors: Ryoichi Nishida, Ikoma; Shinichi Kawasaki, Tsuzuki; Hiroaki Murase, Kyoto, all of Japan--.

Signed and Sealed this

Twenty-third Day of September, 1997

Attest:

BRUCE LEHMAN

Attesting Officer

Commissioner of Patents and Trademarks